US012773048B2

(12) United States Patent
Sun

(10) Patent No.: US 12,773,048 B2
(45) Date of Patent: Oct. 27, 2026

(54) BRIDGING STRUCTURE OF SOFA FRAME

(71) Applicant: Ningbo Joyic Import and Export Co., Ltd., Zhejiang (CN)

(72) Inventor: Danming Sun, Zhejiang (CN)

( * ) Notice: Subject to any disclaimer, the term of this patent is extended or adjusted under 35 U.S.C. 154(b) by 41 days.

(21) Appl. No.: 18/915,440

(22) Filed: Oct. 15, 2024

(65) Prior Publication Data

US 2026/0101998 A1 Apr. 16, 2026

(51) Int. Cl.

| | |
|---|---|
| ***A47C 1/124*** | (2006.01) |
| ***A47C 4/02*** | (2006.01) |
| ***A47C 13/00*** | (2006.01) |
| ***A47C 17/02*** | (2006.01) |
| ***A47C 17/34*** | (2006.01) |
| ***A47C 17/86*** | (2006.01) |
| ***F16B 12/10*** | (2006.01) |
| ***F16B 12/20*** | (2006.01) |
| ***F16B 12/32*** | (2006.01) |
| ***F16B 12/40*** | (2006.01) |

(52) U.S. Cl.

CPC ................ *A47C 1/124* (2013.01); *A47C 4/02* (2013.01); *A47C 13/005* (2013.01); *A47C 17/02* (2013.01); *A47C 17/34* (2013.01); *A47C 17/86* (2013.01); *F16B 12/10* (2013.01); *F16B 12/20* (2013.01); *F16B 12/32* (2013.01); *F16B 12/40* (2013.01); *F16B 2012/106* (2013.01)

(58) Field of Classification Search

CPC ........... A47C 17/02; A47C 17/34; A47C 4/02; A47C 1/124; A47C 13/005; F16B 12/10; F16B 12/20; F16B 12/32; F16B 12/40; F16B 2012/106

USPC ............ 297/248, 233, 440.1, 440.14, 440.15

See application file for complete search history.

(56) References Cited

U.S. PATENT DOCUMENTS

| | | | | | |
|---|---|---|---|---|---|
| 2,637,081 | A * | 5/1953 | Henrikson | A47C 1/124 | 297/248 |
| 3,011,227 | A * | 12/1961 | Vogel | A47C 1/124 | 297/248 |
| 3,439,951 | A * | 4/1969 | Wright | A47C 17/34 | 297/7 |
| 9,226,592 | B2 * | 1/2016 | Lin | A47C 7/58 | |
| 11,278,124 | B2 * | 3/2022 | Choi | A47C 19/126 | |
| 11,672,351 | B2 * | 6/2023 | Clabots | A47C 1/124 | 297/248 |
| 11,808,291 | B2 * | 11/2023 | Wang | A47C 7/02 | |
| 11,944,203 | B2 * | 4/2024 | Shih | A47C 17/02 | |
| D1,074,247 | S * | 5/2025 | Nelson | D6/381 | |
| 12,484,702 | B2 * | 12/2025 | Lawson | A47C 4/022 | |
| 12,551,021 | B1 * | 2/2026 | Li | A47C 13/005 | |
| 12,551,022 | B2 * | 2/2026 | Wu | A47C 4/028 | |
| 2007/0210631 | A1 * | 9/2007 | Berning | A47C 13/005 | 297/248 |
| 2009/0045666 | A1 * | 2/2009 | Westendorf | A47C 13/005 | 297/440.1 |

(Continued)

*Primary Examiner* — Robert Canfield

(74) *Attorney, Agent, or Firm* — Hawaii Patent Services; Nathaniel K. Fedde; Kenton N. Fedde

(57) ABSTRACT

A bridging structure of a sofa frame comprises a base set and a backrest set, wherein a detachable connector is provided between the base set and the backrest set; wherein, the connector is composed of at least two segments, and the at least two segments are fixedly connected and have a first included angle; the connector has at least two connecting panels, which are respectively connected to the base set and the backrest set.

20 Claims, 7 Drawing Sheets

(56) References Cited

U.S. PATENT DOCUMENTS

| | | | | |
|---|---|---|---|---|
| 2009/0205129 | A1* | 8/2009 | Shih | A47C 17/02 5/12.1 |
| 2017/0367486 | A1* | 12/2017 | Nelson | A47C 13/005 |
| 2021/0267378 | A1* | 9/2021 | Ozturk | A47C 17/165 |
| 2022/0361681 | A1* | 11/2022 | Jiang | A47C 19/005 |
| 2023/0038420 | A1* | 2/2023 | Eglinton | A47C 4/02 |
| 2023/0235768 | A1* | 7/2023 | Wang | A47C 7/02 297/74 |
| 2023/0270252 | A1* | 8/2023 | Shih | A47C 17/02 297/440.11 |
| 2023/0270258 | A1* | 8/2023 | Shih | A47C 4/028 297/440.11 |
| 2024/0108145 | A1* | 4/2024 | Armond | A47C 13/005 |
| 2024/0358156 | A1* | 10/2024 | Wu | A47C 7/546 |

* cited by examiner

BRIDGING STRUCTURE OF SOFA FRAME

TECHNICAL FIELD

The present disclosure relates to the technical field of furniture, in particular to a bridging structure of a sofa frame.

BACKGROUND

At present, the sofa backrest and sofa body in the market are usually fixedly connected by fasteners such as bolts or screws, and assembled into a sofa assembly structure. However, this fixed connection mode is not conducive to the assembly and disassembly of the sofa backrest, causing trouble in the transportation process, and the sofa backrest is difficult to replace and maintain, resulting in material waste.

The existing U.S. Pat. No. 8,893,323 discloses a foldable articulated sofa bed. The seat cushion of the patent can be folded and transformed from a larger bed shape to a smaller seat shape, but the folded sofa bed is still a whole with a larger volume, which is not conducive to storage and transportation.

Therefore, there is a need to propose a new type of bridging structure of a sofa frame, which can split the sofa into smaller combined modules, which facilitates storage and transportation.

SUMMARY

The terms "invention," "the invention," "this invention" and "the present invention" used in this patent are intended to refer broadly to all of the subject matter of this patent and the patent claims below. Statements containing these terms should be understood not to limit the subject matter described herein or to limit the meaning or scope of the patent claims below. Embodiments of the invention covered by this patent are defined by the claims below, not this summary. This summary is a high-level overview of various embodiments of the invention and introduces some of the concepts that are further described in the Detailed Description section below. This summary is not intended to identify key or essential features of the claimed subject matter, nor is it intended to be used in isolation to determine the scope of the claimed subject matter. The subject matter should be understood by reference to appropriate portions of the entire specification of this patent, any or all drawings and each claim.

The present disclosure provides a bridging structure of a sofa frame to solve the problems of large sofa volume and inconvenient storage and transportation in the background technology.

In order to solve the above problems, the present disclosure adopts the following technical solutions.

The present disclosure provides a bridging structure of a sofa frame, which includes a base set and a backrest set; a detachable connector is provided between the base set and the backrest set; the connector is composed of at least two segments, and the at least two segments are fixedly connected and have a first included angle; the connector has at least two connecting panels, which are respectively connected to the base set and the backrest set; the at least two connecting panels are distributed crosswise through the first included angle so that a second included angle is formed between the base set and the backrest set; each connecting panel is provided with a locking structure for locking the connector with the base set and the backrest set.

The present disclosure further provides a bridging structure of a sofa frame, which includes a plurality of base bodies and backrest bodies; a detachable connector is provided between each base body and each backrest body; the connector has at least two connecting panels, which are respectively connected to the base body and the backrest body; the at least two connecting panels are distributed crosswise so that an included angle is formed between each base body and each backrest body; the connecting panel is provided with a locking structure for locking the connector with each base body and each backrest body.

The present disclosure further provides a bridging structure of a sofa frame, which includes a plurality of base bodies and backrest bodies; a detachable connector is provided between each base body and each backrest body; the connector is composed of at least two segments, and the at least two segments are fixedly connected and have a first included angle; the connector includes a first connecting panel and a second connecting panel; the first connecting panel and the second connecting panel are distributed crosswise through the first included angle so that a second included angle is formed between each base body and each backrest body; the first connecting panel is detachably installed at a joint of two adjacent backrest bodies, and the second connecting panel is detachably installed at a joint of two adjacent base bodies.

BRIEF DESCRIPTION OF DRAWINGS

In order to explain the technical scheme of this application more clearly, the drawings needed in the implementation will be briefly introduced below. Obviously, the drawings described below are only some implementations of this application. For those skilled in the art, other drawings can be obtained according to these drawings without creative work.

Figure 1:
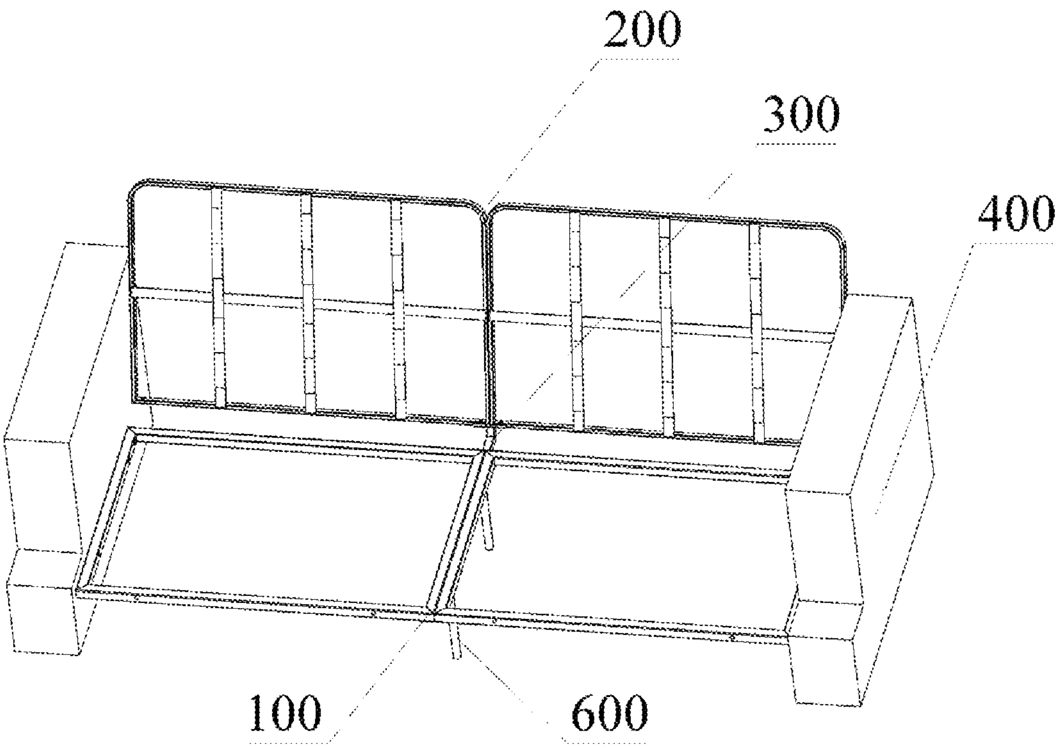
FIG. 1 is a schematic diagram of the three-dimensional structure of the present disclosure.

Reference signs: Base set (100); Rear bar (101); Base body (102); Second connecting hole (103); Backrest set (200); Bottom bar (201); Backrest body (202); Side bar (203); Third connecting hole (213); Connector (300); Connecting panel (301); Fixing strip (302); First segment (303); Second segment (304); First connecting hole (311); First through hole (312); First connecting panel (321); Second connecting panel (331); Armrest (400); U-shaped groove (500); Support foot (600); Connecting block (601); Second through hole (602).

DESCRIPTION OF EMBODIMENTS

In describing the preferred embodiments, specific terminology will be resorted to for the sake of clarity. It is to be understood that each specific term includes all technical equivalents which operate in a similar manner to accomplish a similar purpose.

While various aspects and features of certain embodiments have been summarized above, the following detailed description illustrates a few exemplary embodiments in further detail to enable one skilled in the art to practice such embodiments. Reference will now be made in detail to embodiments of the inventive concept, examples of which are illustrated in the accompanying drawings. The accompanying drawings are not necessarily drawn to scale. The described examples are provided for illustrative purposes and are not intended to limit the scope of the invention. It should be understood, however, that persons having ordinary skill in the art may practice the inventive concept without these specific details.

It will be understood that, although the terms first, second, etc. may be used herein to describe various elements, these elements should not be limited by these terms. These terms are only used to distinguish one element from another. For example, a first attachment could be termed a second attachment, and, similarly, a second attachment could be termed a first attachment, without departing from the scope of the inventive concept.

It will be understood that when an element or layer is referred to as being "on," "coupled to," or "connected to" another element or layer, it can be directly on, directly coupled to or directly connected to the other element or layer, or intervening elements or layers may be present. In contrast, when an element is referred to as being "directly on," "directly coupled to," or "directly connected to" another element or layer, there are no intervening elements or layers present. Like numbers refer to like elements throughout. As used herein, the term "and/or" includes any and all combinations of one or more of the associated listed items.

As used in the description of the inventive concept and the appended claims, the singular forms "a," "an," and "the" are intended to include the plural forms as well, unless the context clearly indicates other.

As shown in FIG. 1, the present disclosure provides a bridging structure of a sofa frame, which includes a base set 100 and a backrest set 200. A detachable connector 300 is provided between the base set 100 and the backrest set 200, and the connector 300 has two connecting panels 301 respectively connected to the base set 100 and the backrest set 200.

In this embodiment, the base set 100 is composed of a plurality of base bodies 102, and the backrest set 200 is composed of a plurality of backrest bodies 202. The connecting panel 301 is detachably fixed on the base set 100 and the backrest set 200, respectively, so that the connector 300 realizes the stable connection between the base set 100 and the backrest set 200 and allows disassembly for transportation or maintenance.

In other embodiments, the connector 300 can be adjusted according to the actual situation, and the connector 300 can be replaced by other types of connection mechanisms, such as sliding rail, rotating lock, magnetic connection, etc., as long as these alternatives can maintain the stability and detachability of the connection.

Figure 3:
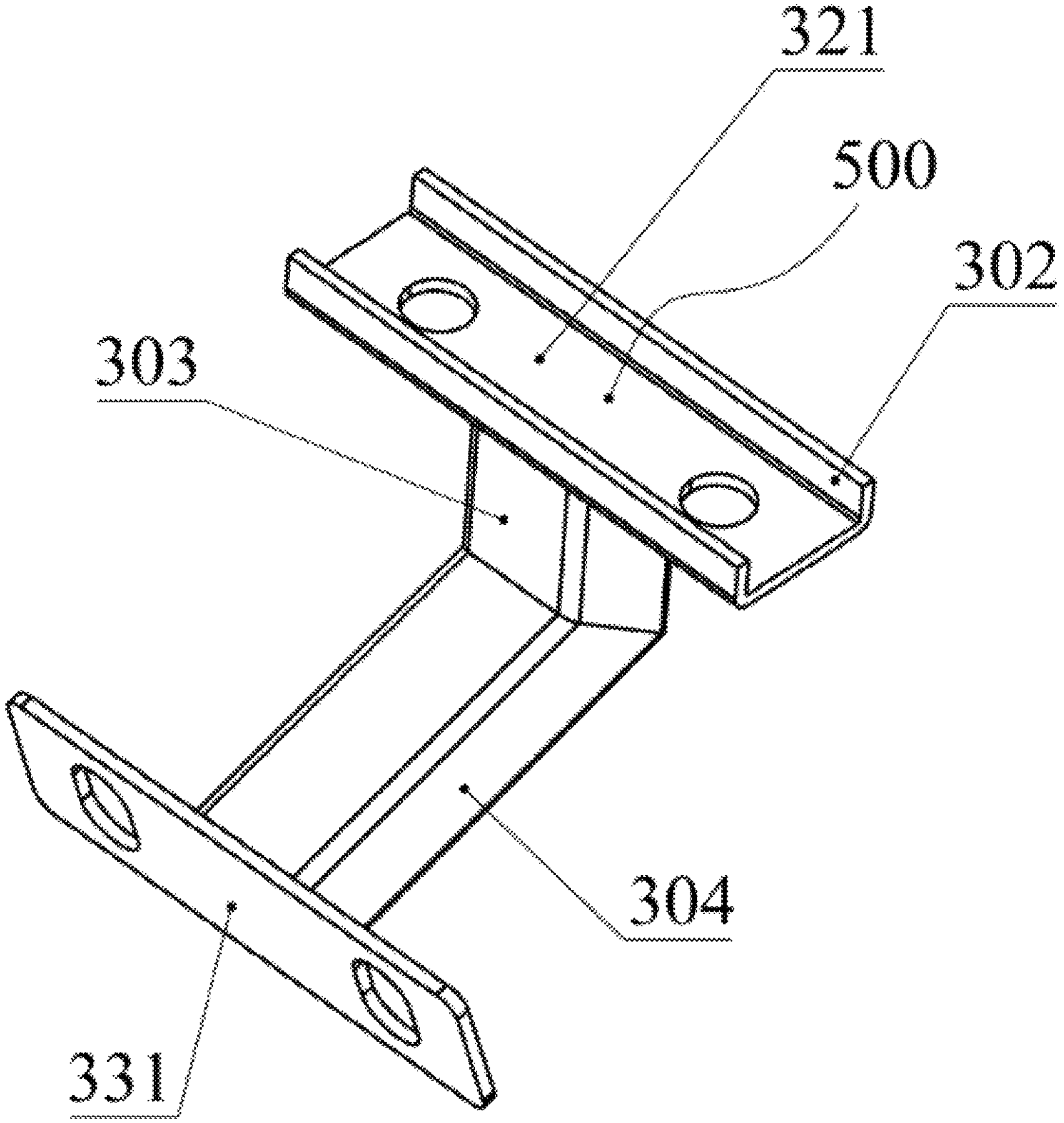
FIG. 3 is a schematic view of the three-dimensional structure from another perspective of FIG. 2.

As shown in FIG. 3, in this embodiment, the connector 300 is composed of a first segment 303 and a second segment 304, which are welded to each other with a first included angle. The connecting panel 301 includes a first connecting panel 321 and a second connecting panel 331, which are welded to the other ends of the first segment 303 and the second segment 304, respectively. The first connecting panel 321 and the second connecting panel 331 are intersected by a first included angle, and the included angle is between 90 degrees and 180 degrees. Therefore, when the connector 300 connects the base set 100 and the backrest set 200, there is also a second included angle between the base set 100 and the backrest set 200, and the included angle ranges from 90 degrees to 180 degrees, thus making the sofa more comfortable for sitting.

In other embodiments, the angles of the first included angle and the second included angle can also be set to different angles, and the specific angles can be adjusted according to actual production needs.

In other embodiments (not shown), the connector 300 can also be a whole segment that is integrally formed. The whole segment has a bent portion, and the bent portion can be arc-shaped or angular. The first connecting panel 321 and the second connecting panel 331 are distributed crosswise through the bent portion. Therefore, when the connector 300 connects the base set 100 and the backrest set 200, there will be an angle between the base set 100 and the backrest set 200.

Figure 4:
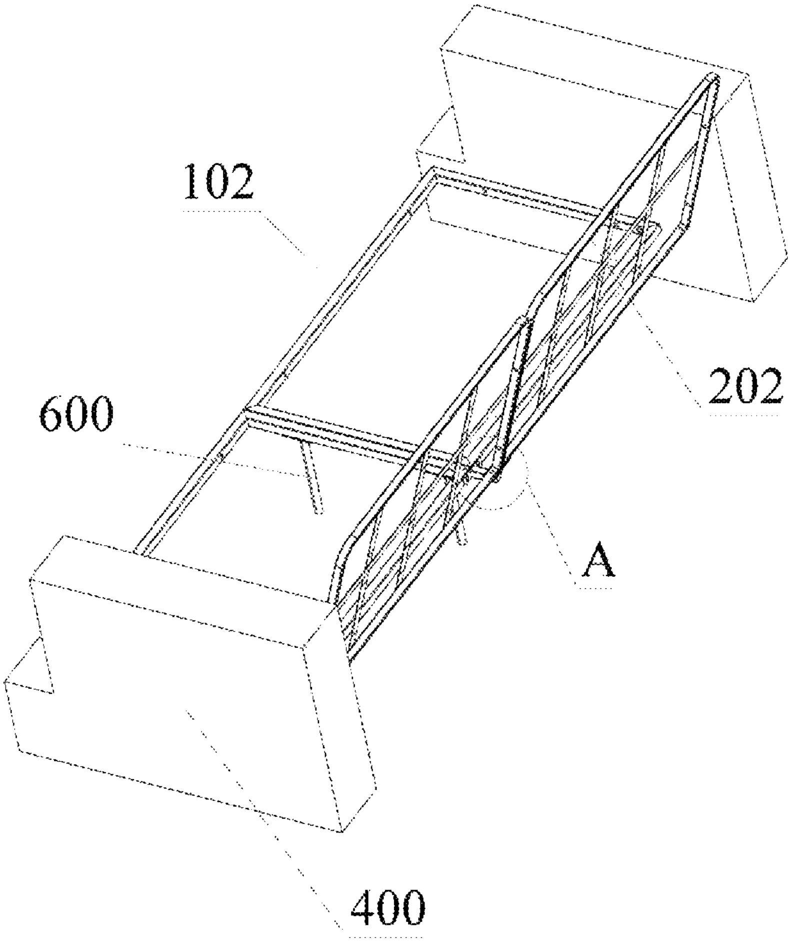
FIG. 4 is a schematic view of the three-dimensional structure from another perspective of FIG. 1.
Figure 5:
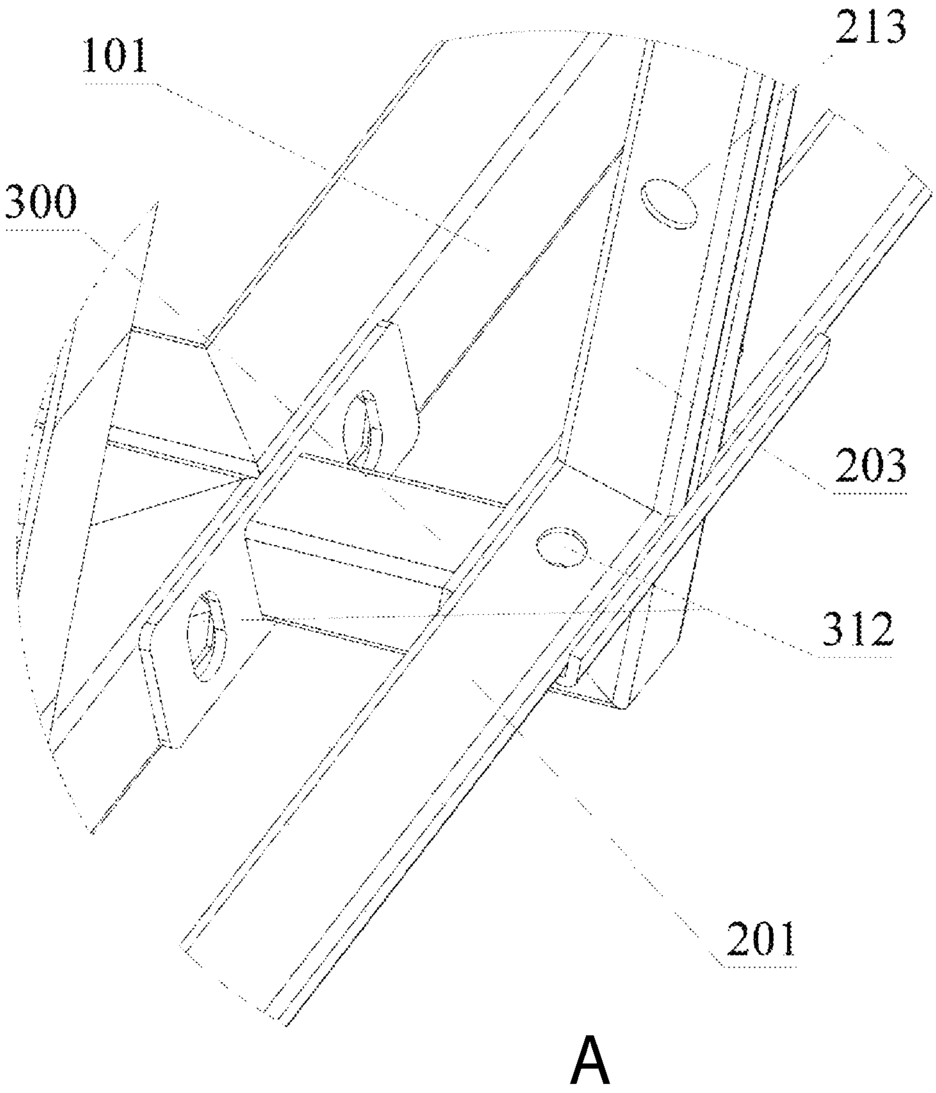
FIG. 5 is an enlarged schematic view of part A in FIG. 4.

As shown in FIGS. 4 and 5, the first connecting panel 321 is detachably fixed at the joint of two adjacent backrest bodies 202. Since the first connecting panel 321 is fixed at the joint of two adjacent backrest bodies 202, the first connecting panel 321 can fix two adjacent backrest bodies 202 together. The second connecting panel 331 is detachably fixed at the joint of two adjacent base bodies 102. Since the second connecting panel 331 is fixed at the joint of two adjacent base bodies 102, it can fix the two adjacent base bodies 102 together.

In this embodiment, the first connecting panel 321 is detachably fixed at the joint of two adjacent backrest bodies 202, and the second connecting panel 331 is also detachably fixed at the joint of two adjacent base bodies 102. In other embodiments, the fixing mode of the first connecting panel 321 can be adjusted, which can be realized by different connection structures, such as screw fixing, snap connection, magnetic connection and the like. Similar to the first connecting panel 321, its fixing mode can also be realized by various structures, including but not limited to screws, buckles, magnetic attraction, etc. Meanwhile, the structure of the connecting panel 301 can also be replaced and adjusted to optimize the connection effect and improve the installation efficiency. For example, a connecting panel 301 with a positioning function can be provided to reduce the alignment difficulty during installation.

Figure 2:
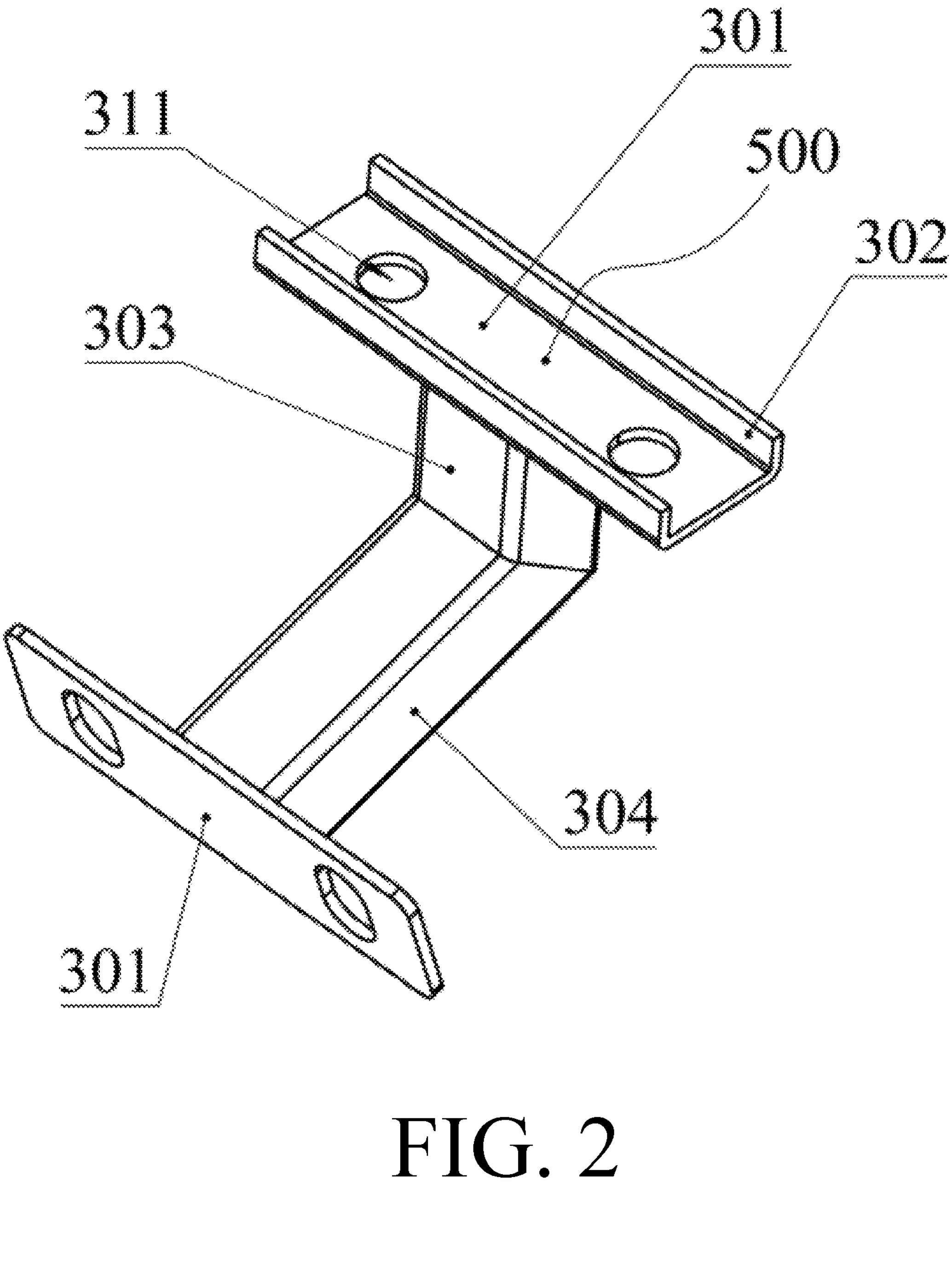
FIG. 2 is a schematic view of the three-dimensional structure of the connector in FIG. 1.

As shown in FIG. 2, two longitudinal sides of the first connecting panel 321 are provided with fixing strips 302, and the bottom bar 201 of the backrest body 202 can be clamped into the U-shaped groove 500 formed by the fixing strips 302 and the first connecting panel 321, which can assist the bolt to fix the connector 300 and increase the stability of the connecting structure.

In this embodiment, the fixing strips 302 are arranged at the two longitudinal sides of the first connecting panel 321, and form a U-shaped groove 500 together with the first connecting panel 321 for the bottom bar 201 of the backrest body 202 to be clamped. In other embodiments, the above structure can also achieve the same function in other ways. For example, different groove designs are used, such as V-shaped grooves, L-shaped grooves or grooves with other shapes, as long as they can stably accommodate the bottom bar 201. The fixing strips 302 are replaced with other types of fixing structures, such as clamps, clips or adjustable locking devices, which can be directly fixed on the first connecting panel 321 and form a firm connection with the bottom bar 201. At the same time, the bottom bar 201 can be adjusted according to the change of the U-shaped groove

500, and the shape, size or material of the bottom bar 201 can be changed to better adapt to the U-shaped groove 500 or other types of fixed structures. The bottom bar 201 with a special connection interfaces can also be used to match different types of connectors 300 or fixed structures.

As shown in FIG. 2 and FIG. 3, in a preferred solution of this embodiment, the connecting panel 301 is provided with a locking structure matched with the base set 100 and the backrest set 200. The locking structure includes a first connecting hole 311 formed in the connecting panel 301 into which a bolt can be inserted. As shown in FIG. 5, the base set 100 includes a rear bar 101, and the backrest set 200 includes a bottom bar 201. Both the rear bar 101 and the bottom bar 201 are provided with first through holes 312 matched with the first connecting hole 311.

When the first through hole 312 on the rear bar 101 is aligned with the first connecting hole 311 on one of the connecting panels 301, the connector 300 can be fixed on the base set 100 by passing a bolt through two holes. Similarly, when the first through hole 312 on the bottom bar 201 is aligned with the first connecting hole 311 on the other connecting panel 301, the connector 300 can be fixed on the backrest set 200 by passing a bolt through two holes. Thereby, the base set 100 and the backrest set 200 are assembled together. When the sofa needs to be stored or transported, the connector 300 can be detached, and then the base set 100 and the backrest set 200 can be detached and separated, thus reducing the volume of the sofa and facilitating storage and transportation.

In this embodiment, the locking structure relies on locking of the bolt through the fitting between the first connecting hole 311 and the first through holes 312 on the base set 100 and the backrest set 200. In other embodiments, this method can achieve the same function through other types of locking mechanisms, such as: using buckle or quick release locking devices, which can be directly fitted with the connecting panel 301, the rear bar 101 and the bottom bar 201 to realize quick locking and unlocking; of course, it can also be a rotary locking structure, and locking can be realized by rotating the connector 300 or a certain part. This structure may not need additional bolts or connecting holes; it is also possible to use magnetic connection to firmly connect the connecting panel 301 with the base body 102 and the backrest body 202 by strong magnetic force.

As shown in FIG. 4, in this embodiment, the backrest set 200 includes a plurality of backrest bodies 202 arranged in parallel, and two adjacent backrest bodies 202 are detachably connected. The backrest body 202 includes a side bar 203, and the side bars 203 of two adjacent backrest body 202 are both provided with mutually aligned third connecting holes 213. Bolts may be inserted into the third connecting holes 213 to lock the two side bars 203. When the side bars 203 of two adjacent backrest bodies 202 are attached to each other, the third connecting holes 213 of the two side bars 203 are aligned with each other. At this time, bolts can be passed through the two third connecting holes 213, and then the two adjacent backrest bodies 202 can be fixed together by tightening the bolts.

In this embodiment, two adjacent backrest bodies 202 are detachably connected through bolts and third connecting holes 213. In other embodiments, other detachable connection modes with the same function can be used according to the actual situation, such as: using buckle connection to realize quick connection and separation of backrest body by pressing or rotating the buckle; alternatively, it may also use a mode of connecting a slot with a slide rail, so that the backrest body 202 can slide along the slide rail and be locked at the required position; alternatively, it may also be a magnetic connection, and the adjacent backrest bodies 202 can be closely attached together by magnetic force.

In this embodiment, the backrest bodies 202 are arranged in parallel, but this arrangement can be adjusted according to the overall design and use requirements of the sofa. For example, the connector 300 between two adjacent backrest bodies 202 can be set to be rotatable so as to be folded to save space or change the layout of the sofa when not in use.

Of course, in other embodiments of the connector 300 (not shown), the two connecting panels 301 of the connector 300 can also be arranged in an arc shape. This makes the connector 300 suitable for curved sofas, without being limited to the straight ones in this embodiment.

Figure 6:
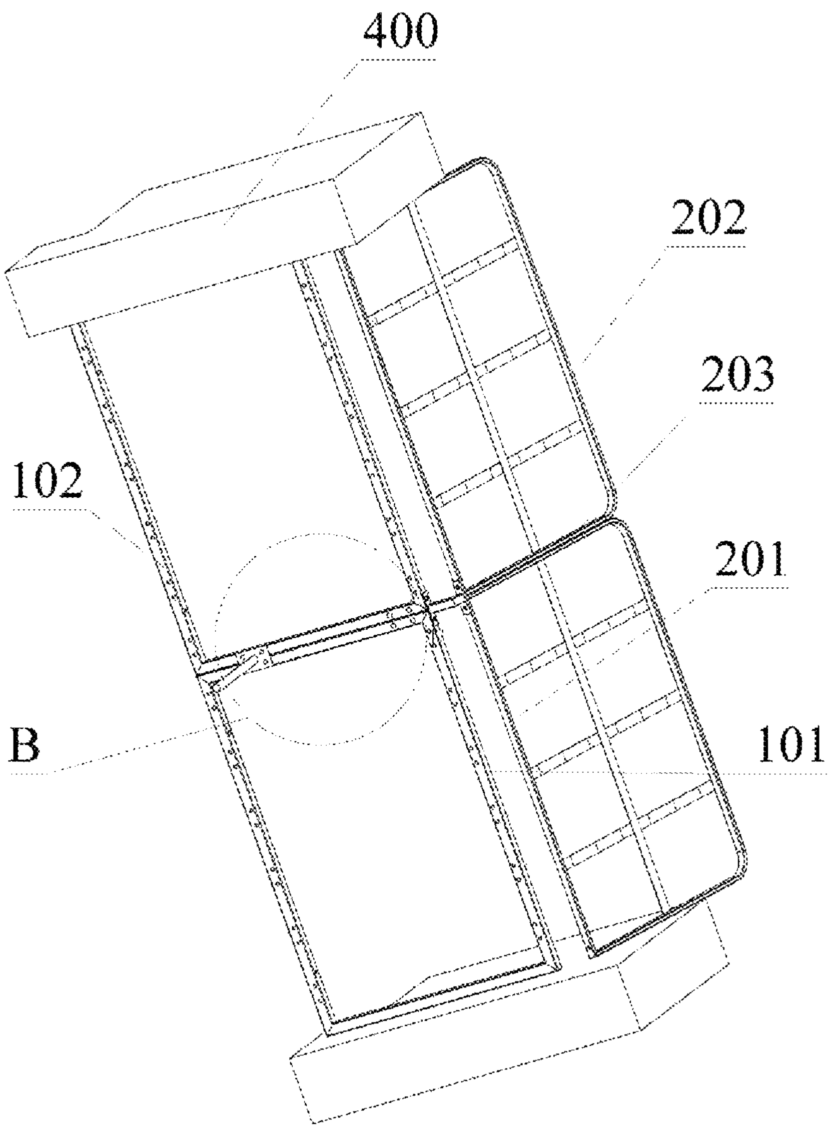
FIG. 6 is a schematic view of the three-dimensional structure of FIG. 1 from another perspective.
Figure 7:
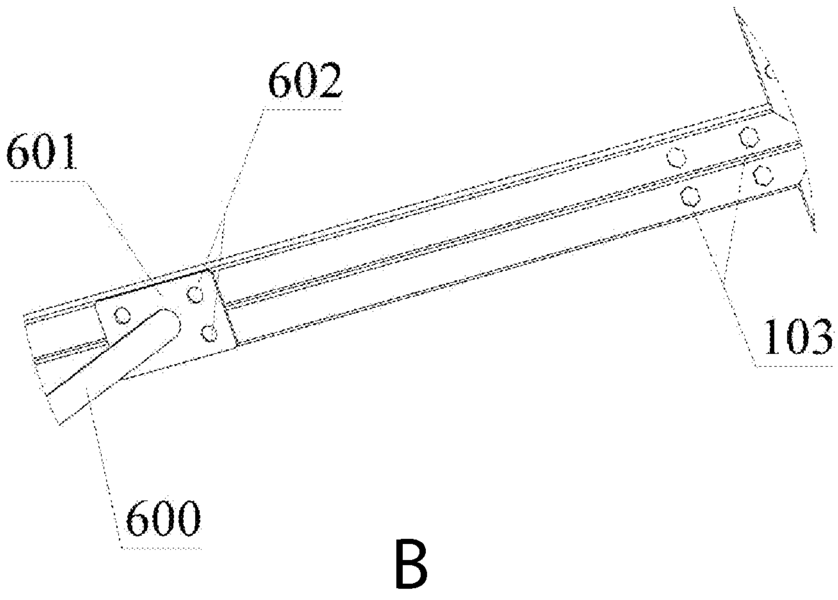
FIG. 7 is an enlarged schematic view of part B in FIG. 6.

As shown in FIG. 4, in this embodiment, the base set 100 includes a plurality of base bodies 102 arranged in parallel, and two adjacent base bodies 102 are detachably connected. As shown in FIGS. 6 and 7, the joints of the bottoms of two adjacent base bodies 102 are both provided with second connecting holes 103 through which bolts can pass. The joint of two adjacent base bodies 102 is detachably provided with a support foot 600, and the upper end of the support foot 600 is provided with a connecting block 601, which is provided with a second through hole 602 to be used in cooperation with the second connecting hole 103. When two adjacent base bodies 102 are attached to each other, the second through hole 602 on the connecting block 601 can be aligned with the second connecting hole 103 opened at the joint of the two base bodies. At this time, a bolt can pass through the two holes, and then the support feet 600 is fixed at the bottom of the base bodies 102 by tightening the bolts. At the same time, the connecting block 601 is fixed at the joint of the two base bodies 102 by bolts, that is, the connecting block 601 is locked on two base bodies at the same time. The support feet 600 can support between two adjacent base bodies 102, thus improving the bearing capacity of the sofa and the stability of sofa splicing.

In this embodiment, the connections between two adjacent base bodies 102 and between the base bodies 102 and the support feet 600 are realized by bolts passing through the second connecting holes 103 and the second through holes 602. In other embodiments, this connection mode can be replaced by other types of detachable connection structures, for example: using snap connection or quick release locking devices, which can directly cooperate with the connection part of the base body 102 and the support feet 600 to realize quick connection and separation; it is also possible to use a connection mode that a slot is connected with a slide rail, so that the base body 102 can slide along the slide rail and be locked at the required position. The support feet 600 can also be connected with the base body 102 in a similar way.

As a part of the connecting structure, the support foot 600 and its connecting block 601 can be adjusted as required in other embodiments. For example, the shape, size or material of the support foot 600 can be changed to meet different design and load-bearing requirements of the base body 102. The structure of the connecting block 601 can also be optimized to improve the stability of connection and the convenience of installation.

Although the base bodies 102 are arranged side by side in this embodiment, this arrangement can be adjusted according to the overall structure and use requirements of the sofa. For example, the connection between two adjacent base bodies 102 can be designed to be rotatable, so as to be folded to save space or change the layout of the sofa when not in use.

As shown in FIG. 1 and FIG. 4, in this embodiment, one side of the backrest body 202 far from the adjacent backrest body 202 is detachably connected with an armrest 400, that is, the two sides of the backrest set 200 formed by combining a plurality of backrest bodies 202 in parallel are detachably connected with the armrests 400.

In a preferred solution of this embodiment, a bolt connection structure may be selected for the detachable mode. The backrest body 202 contacting with the armrest 400 can be provided with a through hole, and the armrest 400 can be provided with a communication hole corresponding to the through hole on the backrest body 202. When the two holes are aligned, bolts can be locked to fix the backrest set 200 on the armrest. One side of the base body 102 far away from the adjacent base body 102 is detachably connected to the armrest 400, that is, both sides of the base set 100 formed by combining a plurality of base bodies 102 side by side are detachably connected with the armrests 400. The base set 100 can also be fixed on the armrest 400 by using a bolt connection structure in the same way as the backrest set 200 and the armrest 400.

In this embodiment, a bolt connection structure is used to realize the detachable connection between the backrest body 202 and the base body 102 and the armrests 400. In other embodiments, this connection mode can be replaced by other types of detachable connection structures, for example: using snap connection or quick release locking devices, which are capable of quick connection and separation without additional tools; alternatively, it is also possible to use a connection mode that a slot is connected with a slide rail, so that the backrest body 202 and the base body 102 can slide along the slide rail provided on the armrest 400 and be locked at the required position.

The technical means disclosed in the scheme of the present invention are not limited to the technical means disclosed in the above embodiments, but also include the technical scheme composed of any combination of the above technical features. It should be pointed out that for those skilled in the art, several improvements and embellishments can be made without departing from the principle of the present invention, and these improvements and embellishments are also regarded as the protection scope of the present invention.

The invention has now been described in detail for the purposes of clarity and understanding. However, those skilled in the art will appreciate that certain changes and modifications may be practiced within the scope of the appended claims.

Conditional language used herein, such as, among others, "can," "could," "might," "may," "e.g.," and the like, unless specifically stated otherwise, or otherwise understood within the context as used, is generally intended to convey that certain examples include, while other examples do not include, certain features, elements, and/or steps. Thus, such conditional language is not generally intended to imply that features, elements and/or steps are in any way required for one or more examples or that one or more examples necessarily include logic for deciding, with or without author input or prompting, whether these features, elements and/or steps are included or are to be performed in any particular example.

The terms "comprising," "including," "having," and the like are synonymous and are used inclusively, in an open-ended fashion, and do not exclude additional elements, features, acts, operations, and so forth. Also, the term "or" is used in its inclusive sense (and not in its exclusive sense) so that when used, for example, to connect a list of elements, the term "or" means one, some, or all of the elements in the list. The use of "adapted to" or "configured to" herein is meant as open and inclusive language that does not foreclose devices adapted to or configured to perform additional tasks or steps. Additionally, the use of "based on" is meant to be open and inclusive, in that a process, step, calculation, or other action "based on" one or more recited conditions or values may, in practice, be based on additional conditions or values beyond those recited. Similarly, the use of "based at least in part on" is meant to be open and inclusive, in that a process, step, calculation, or other action "based at least in part on" one or more recited conditions or values may, in practice, be based on additional conditions or values beyond those recited. Headings, lists, and numbering included herein are for ease of explanation only and are not meant to be limiting.

The various features and processes described above may be used independently of one another, or may be combined in various ways. All possible combinations and sub-combinations are intended to fall within the scope of the present disclosure. In addition, certain method or process blocks may be omitted in some implementations. The methods and processes described herein are also not limited to any particular sequence, and the blocks or states relating thereto can be performed in other sequences that are appropriate. For example, described blocks or states may be performed in an order other than that specifically disclosed, or multiple blocks or states may be combined in a single block or state. The example blocks or states may be performed in serial, in parallel, or in some other manner. Blocks or states may be added to or removed from the disclosed examples. Similarly, the example systems and components described herein may be configured differently than described. For example, elements may be added to, removed from, or rearranged compared to the disclosed examples.

What is claimed is:

1. A bridging structure of a sofa frame, comprising:

a base set and a backrest set, wherein a detachable connector is provided between the base set and the backrest set; and wherein, the connector is composed of at least two segments, and the at least two segments are fixedly connected and have a first included angle; and the connector has at least two connecting panels, which are respectively connected to the base set and the backrest set; and the at least two connecting panels are distributed crosswise through the first included angle so that a second included angle is formed between the base set and the backrest set; and each connecting panel is provided with a locking structure for locking the connector with the base set and the backrest set.

2. The bridging structure of a sofa frame according to claim 1, wherein the at least two segments comprise a first segment and a second segment, which are connected with each other and generate the first included angle; the at least two connecting panels are attached to ends of the first segment and the second segment, respectively.

3. The bridging structure of a sofa frame according to claim 1, wherein the locking structure comprises first connecting holes which are provided on a connecting panel of the at least two connecting panels and into which bolts are insertable.

4. The bridging structure of a sofa frame according to claim 3, wherein the backrest set consists of a plurality of backrest bodies arranged in parallel, and two adjacent backrest bodies are detachably connected.

5. The bridging structure of a sofa frame according to claim 4, wherein the base set consists of a plurality of base bodies arranged in parallel, and two adjacent base bodies are detachably connected.

6. The bridging structure of a sofa frame according to claim 5, wherein one end of a base body of the plurality of base bodies is provided with a rear bar; one end of a backrest body of the plurality of backrest bodies is provided with a bottom bar.

7. The bridging structure of a sofa frame according to claim 6, wherein both the rear bar and the bottom bar are provided with first through holes which are matched with the first connecting holes.

8. The bridging structure of a sofa frame according to claim 1, wherein armrests are detachably installed on the backrest set and the base set at two sides of the sofa frame.

9. The bridging structure of a sofa frame according to claim 1, wherein the first included angle and the second included angle have a same angle, which ranges from 90 degrees to 180 degrees.

10. A bridging structure of a sofa frame, comprising:

a plurality of base bodies and backrest bodies, wherein a detachable connector is provided between each base body and each backrest body; and wherein, the connector has at least two connecting panels, which are respectively connected to adjacent base bodies and backrest bodies; and the at least two connecting panels are distributed crosswise so that an included angle is formed between each base body and each backrest body; and each connecting panel is provided with a locking structure for locking the connector with a base body of the plurality of base bodies and a backrest body of the plurality of backrest bodies.

11. The bridging structure of a sofa frame according to claim 10, wherein the included angle is a second included angle, and connecting holes into which bolts can be inserted are formed at joints of bottoms of two adjacent base bodies.

12. The bridging structure of a sofa frame according to claim 11, wherein a support foot is detachably installed at the joint of two adjacent base bodies, and an upper end of the support foot is provided with a connecting block.

13. The bridging structure of a sofa frame according to claim 12, wherein the connecting block is provided with through holes matched with the connecting holes.

14. A bridging structure of a sofa frame, comprising:

a plurality of base bodies and backrest bodies, wherein a detachable connector is provided between each base body and each backrest body; and wherein, the connector is composed of at least two segments, and the at least two segments are fixedly connected and have a first included angle; and the connector comprises a first connecting panel and a second connecting panel; the first connecting panel and the second connecting panel are distributed crosswise through the first included angle so that a second included angle is formed between each base body and each backrest body; and the first connecting panel is detachably installed at a joint of two adjacent backrest bodies, and the second connecting panel is detachably installed at a joint of two adjacent base bodies.

15. The bridging structure of a sofa frame according to claim 14, wherein the at least two segments comprise a first segment and a second segment, which are connected with each other and generate the first included angle; the first connecting panel and the second connecting panel are respectively attached to ends of the first segment and the second segment.

16. The bridging structure of a sofa frame according to claim 14, wherein each of the backrest bodies is provided with a respective side bar, the respective side bars of two adjacent backrest bodies are both provided with connecting holes, and bolts can be inserted between two adjacent connecting holes to lock the two side bars.

17. The bridging structure of the sofa frame according to claim 16, wherein one end of a base body of the base bodies is provided with a rear bar; one end of a backrest body of the backrest bodies is provided with a bottom bar.

18. The bridging structure of a sofa frame according to claim 17, wherein a joint of bottom bars of two adjacent backrest bodies is provided with a first through hole into which a bolt can be inserted, and the first connecting panel is provided with a first connecting hole which can be matched with the first through hole.

19. The bridging structure of a sofa frame according to claim 18, wherein two longitudinal sides of the first connecting panel are provided with fixing strips, and a U-shaped groove is formed between each fixing strip and the first connecting panel, and the bottom bar can be clamped into the U-shaped groove.

20. The bridging structure of a sofa frame according to claim 19, wherein a joint of rear bars of two adjacent base bodies is provided with a second through hole into which a bolt can be inserted, and the second connecting panel is provided with a second connecting hole which can be matched with the second through hole.

* * * * *